UNITED STATES PATENT OFFICE.

WILLIAM A. GARNER, OF FRESNO, CALIFORNIA.

INSECTICIDE.

SPECIFICATION forming part of Letters Patent No. 373,928, dated November 29, 1887.

Application filed April 20, 1887. Serial No. 235,569. (No specimens.)

*To all whom it may concern:*

Be it known that I, WILLIAM A. GARNER, a citizen of the United States, residing at Fresno, in the county of Fresno and State of California, have invented a new and useful Composition of Matter to be used as an Insecticide, of which the following is a specification.

My invention consists of the following ingredients, combined substantially in the proportions stated, viz: sulphur, ten pounds; gum-camphor, four ounces; asafetida, one ounce; alcohol, one quart. These ingredients are to be thoroughly mixed to a fine powder.

The object of my invention is to destroy all insect pests on trees, shrubs, and plants without in any manner injuring the tree or its fruit or foliage.

The application of the composition is by inserting it under the bark in the path of the sap. This is preferably done by making a vertical incision in the bark of the tree about four or five inches long, and either in the trunk or, in case of large trees, in the main branches.

The bark on each side of the incision is raised and a table-spoonful of the composition is pressed under it, after which the bark is closed down and the incision sealed up with grafting-wax.

I am aware that an insecticide has been formed by uniting the herein-named ingredients with others which were considered essential. I therefore limit myself to an insecticide when formed by combining the ingredients herein specified.

Having thus described my invention, what I claim as new, and desire to secure by Letters Patent, is—

The herein-described composition of matter to be used as an insecticide, consisting of sulphur, gum-camphor, asafetida, and alcohol, in substantially the proportions specified.

In witness whereof I have hereunto set my hand.

WILLIAM A. GARNER.

Witnesses:
J. F. WHARTON,
F. H. SHORT.